(12) United States Patent
Stojanovski et al.

(10) Patent No.: US 8,670,409 B2
(45) Date of Patent: Mar. 11, 2014

(54) SINGLE RADIO VOICE CALL CONTINUITY (SR-VCC)

(75) Inventors: Saso Stojanovski, Paris (FR); Kaniz Mahdi, Carrollton, TX (US); Eric Parsons, Stittsville (CA)

(73) Assignee: Apple Inc., Cupertino, CA (US)

( * ) Notice: Subject to any disclaimer, the term of this patent is extended or adjusted under 35 U.S.C. 154(b) by 667 days.

(21) Appl. No.: 12/812,108

(22) PCT Filed: Dec. 19, 2008

(86) PCT No.: PCT/EP2008/067993
§ 371 (c)(1),
(2), (4) Date: Jul. 8, 2010

(87) PCT Pub. No.: WO2009/089987
PCT Pub. Date: Jul. 23, 2009

(65) Prior Publication Data
US 2010/0290433 A1     Nov. 18, 2010

Related U.S. Application Data

(60) Provisional application No. 61/020,963, filed on Jan. 14, 2008.

(51) Int. Cl.
*H04W 4/00*     (2009.01)
(52) U.S. Cl.
USPC ......................................... 370/331; 455/436
(58) Field of Classification Search
None
See application file for complete search history.

(56) References Cited

U.S. PATENT DOCUMENTS

| 6,230,005 | B1* | 5/2001 | Le et al. ..................... 455/414.1 |
| 7,990,957 | B2* | 8/2011 | Song et al. ..................... 370/354 |
| 8,289,954 | B2* | 10/2012 | Tenny et al. .................. 370/352 |
| 2006/0209805 | A1 | 9/2006 | Mahdi et al. |
| 2007/0014281 | A1 | 1/2007 | Kant |
| 2011/0110326 | A1* | 5/2011 | Rexhepi et al. ............... 370/331 |

FOREIGN PATENT DOCUMENTS

| CN | 101083833 | 12/2007 |
| WO | WO2008002997 A2 | 1/2008 |

OTHER PUBLICATIONS

3GPP: "3GPP TS 23.216 V1.1.0 (Apr. 2008); 3rd Generation Partnership Project; Technical Specification Group Services and System Aspects; Single Radio Voice Call Continuity (SRVCC); Stage 2 (Release 8)" 3GPP, Apr. 2008, pp. 1-26, XP002527735.

(Continued)

*Primary Examiner* — Rhonda Murphy
(74) *Attorney, Agent, or Firm* — Meyertons, Hood, Kivlin, Kowert & Goetzel, P.C.

(57) ABSTRACT

The present invention discloses a node (207, 217) for achieving co-existence of single radio voice call continuity, SR-VCC, solutions in a communication system between a source cell of a first radio access network that supports packet switched voice and a target cell of a second radio access network that supports at least circuit switched voice. The node (207, 217) is operable to perform bearer splitting by separating voice bearers from non-voice bearers based on information about support for dual transfer mode, packet switched handovers and voice over internet protocol related enhancements in the target cell.

18 Claims, 4 Drawing Sheets

(56) References Cited

OTHER PUBLICATIONS

Nortel, Motorola: "S2-082946; Call flows for SRVCC from Eutran to Geran/Utran" 3GPP TSG SA WG2 Meeting #64, Apr. 7-11, 2008, pp. 1-6, Jeju Island, South Korea, XP002527736.

Nortel et al.: "S2-081651; D/F Update" 3GPP TSG SA WG2 Meeting #63, Feb. 18-22, 2008, pp. 1-12, Athens, Greece, XP002527737.

3GPP: "3GPP TR 23.882 V1.12.0 (Oct. 2007); 3rd Generation Partnership Project; Technical Specification Group Services and System Aspects; 3GPP System Architecture Evolution: Report on Technical Options and Conclusions (Release 7)" 3GPP, Oct. 2007, XP002527734, (100 pages)—1st part.

3GPP: "3GPP TR 23.882 V1.12.0 (Oct. 2007); 3rd Generation Partnership Project; Technical Specification Group Services and System Aspects; 3GPP System Architecture Evolution: Report on Technical Options and Conclusions (Release 7)" 3GPP, Oct. 2007, XP002527734, (115 pages)—2nd part.

Nortel; "Single Radio VCC: Consolidated Alternative F-1;" 3GPP TSG-SA WG2 Meeting #61, Ljubljana, Slovenia, Nov. 12-16, 2007; pp. 1-9.

Nortel; "Consolidated Alternative F-1;" TD S2-075323, 3GPP TSG-SA WG2 Meeting #61, Ljubljana, Slovenia, Nov. 12-16, 2007; pp. 1-11.

Office Action in Japanese Patent Application No. 2010-542557, Dec. 18, 2012, pp. 1-3.

Translation of the First Office Action in Chinese Patent Application No. 200880125101.4, Jan. 28, 2013, pp. 1-5.

* cited by examiner

SINGLE RADIO VOICE CALL CONTINUITY (SR-VCC)

CROSS-REFERENCE TO RELATED APPLICATION

This is a national stage application under 35 USC §371 of PCT/EP2008/067993, filed Dec. 19, 2008, which claims the benefit under 35 USC §119(e) of U.S. provisional application Ser. No. 61/020,963, filed Jan. 14, 2008, both hereby incorporated by reference.

FIELD OF THE INVENTION

The present invention discloses a solution for single radio voice call continuity. More specifically, the invention relates to a method of performing a handover (HO) from a first radio access network (RAN) to a second RAN. The invention equally relates to a network entity in a wireless communication system where the teachings of this invention can be applied.

BACKGROUND OF THE INVENTION

Voice continuity between voice over internet protocol multimedia subsystem (VoIMS) over evolved universal terrestrial radio access network (EUTRAN) and general packet radio service enhanced data rates for global evolution radio access network (GERAN) circuit switched (CS) domain or UTRAN CS domain requires a transformation of a VoIMS session into CS voice and vice versa. This transformation falls into the voice call continuity (VCC) category, which is a feature of the third generation partnership project (3GPP) Rel-7. However, this Rel-7 feature requires "dual radio", i.e., a simultaneous connection to the source and target radio during the transition period. The use of "dual radio" is possible between wireless local area network (WLAN) radio and GERAN, UTRAN or EUTRAN radio, but not possible between EUTRAN and GERAN CS or between EUTRAN and UTRAN CS.

There are several single radio (SR) VCC candidate solutions listed in 3GPP TR 23.882, such as (1) Combinational VCC (C-VCC); and (2) Inter-mobile switching centre (Inter-MSC) handover (HO).

Although not yet addressed, there is a need to achieve co-existence of single radio (SR) voice call continuity solutions with VoIP capable GERAN/UTRAN. The invention also provides a solution that achieves co-existence between the C-VCC solution and the inter-MSC HO solution. In case an operator has UTRAN or has started partial deployment of enhanced GERAN access that can support C-VCC, there is a need to interwork the two solutions by allowing using one or the other on per-call basis.

SUMMARY OF THE INVENTION

The object of the present invention is to provide a reliable method for performing a HO from packet switched (PS) system to a circuit switched (CS) system without call interruption and more specifically from a fourth generation (4G) system to a third (3G) or second generation (2G) system.

According to a first aspect of the invention, there is provided a node for achieving co-existence of single radio voice call continuity solutions in a communication system between a source cell of a first radio access network that supports packet switched voice and a target cell of a second radio access network that supports at least circuit switched voice, wherein the node is operable to perform bearer splitting by separating voice bearers from non-voice bearers based on information about support for dual transfer mode, packet switched handovers and voice over internet protocol related enhancements in the target cell.

Thus, the present invention provides a reliable method of interworking the C-VCC and inter-MSC HO solutions.

According to a second aspect of the invention, there is provided a method of achieving co-existence of single radio voice call continuity solutions in a communication system between a source cell of a first radio access network that supports packet switched voice and a target cell of a second radio access network that supports at least circuit switched voice, the method comprising performing bearer splitting by separating voice bearers from non-voice bearers based on information about support for dual transfer mode, packet switched handovers and voice over internet protocol related enhancements in the target cell.

BRIEF DESCRIPTION OF THE DRAWINGS

Other features and advantages of the invention will become apparent from the following non-limiting description with reference to the appended drawings, in which.

DETAILED DESCRIPTION OF EMBODIMENTS OF THE INVENTION

The embodiment set forth below represents the necessary information to enable those skilled in the art to practice the invention and illustrates an advantageous embodiment of practicing the invention. Upon reading the following description in light of the accompanying drawing figures, those skilled in the art will understand the concepts of the invention and will recognise applications of these concepts not particularly addressed herein. It should be understood that these concepts and applications fall within the scope of the disclosure.

As explained above, there are several possibilities, such as C-VCC or inter-MSC HO, to implement SR VCC for 3GPP access.

Figure 1:
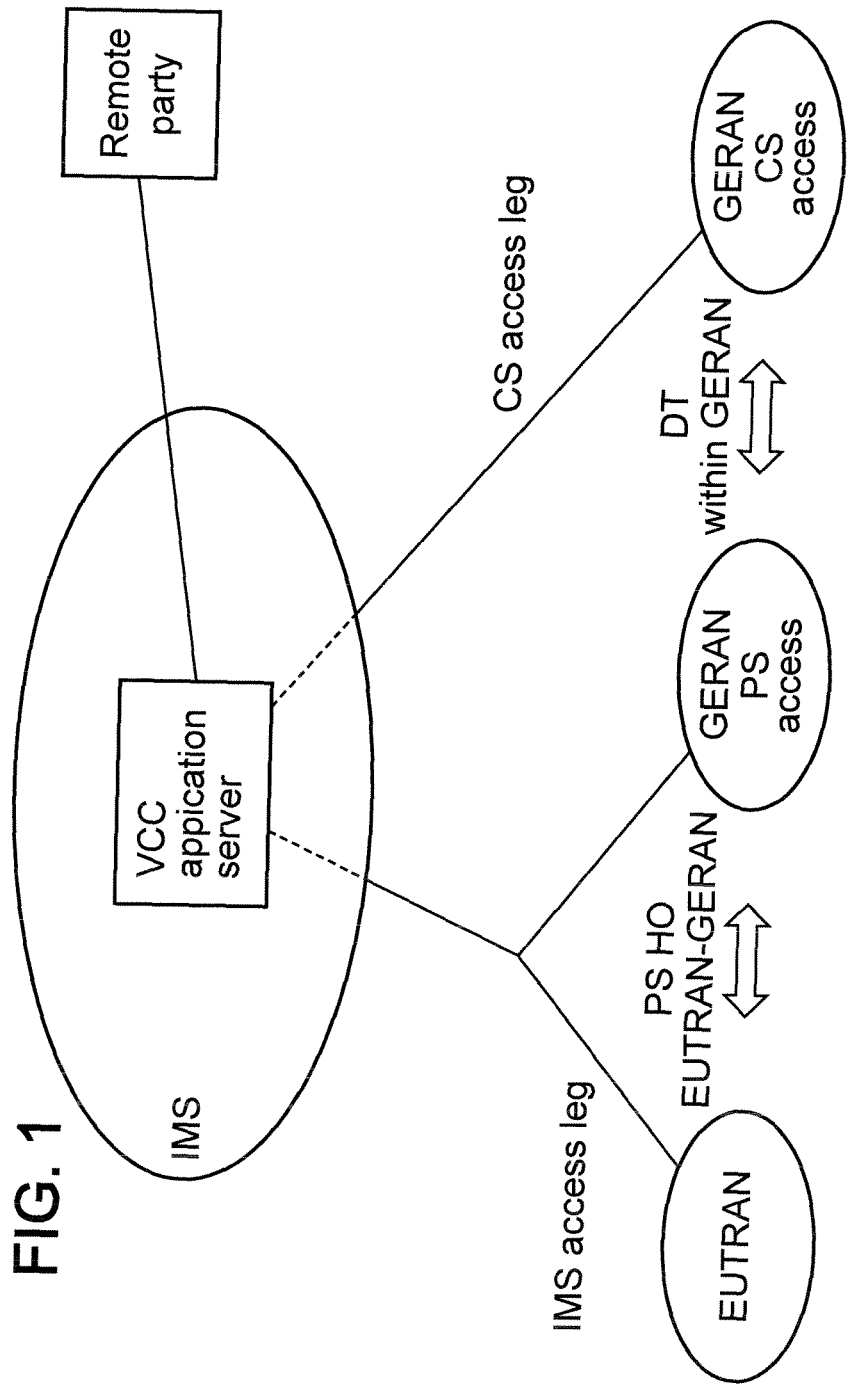
FIG. 1 illustrates a network structure where the C-VCC can be implemented.

The C-VCC solution is briefly described with reference to FIG. 1. In FIG. 1 there are shown two RANs, namely EUTRAN, which is a PS network and does not support CS connections, and GERAN providing both CS and PS connections simultaneously (DTM). A voice call continuity application server operates in the IMS. A HO from the EUTRAN to the GERAN CS is done in the C-VCC solution by using the GERAN PS as an intermediary step.

First user equipment (UE) performs a PS HO from the EUTRAN to the GERAN PS. Then the UE relies on the availability of simultaneous CS and PS connections over GERAN in order to perform a domain transfer (DT) from the GERAN PS to the GERAN CS. This requires PS handover and DTM support on the GERAN side, and possibly VoIP related enhancements (the latter may be needed to avoid perceptible deterioration of the voice quality during the couple of seconds needed to perform the domain transfer).

Thus, the intent is to use the GERAN PS only as a "changing room", i.e. the UE is not kept in the GERAN PS longer than necessary to perform the DT procedure. Briefly, this C-VCC solution is a combination of radio-level HO and application level DT.

FIG. 1 also applies to the case where the target access is UTRAN. Contrary to GERAN access, the UTRAN access intrinsically supports PS HO and DTM operation, and may be capable of VoIP support without any VoIP-related enhancements.

In summary, the C-VCC solution is applicable in deployed UTRAN networks without any major changes, whereas deployed GERAN networks would need significant enhancements in order to support it.

Figure 2:
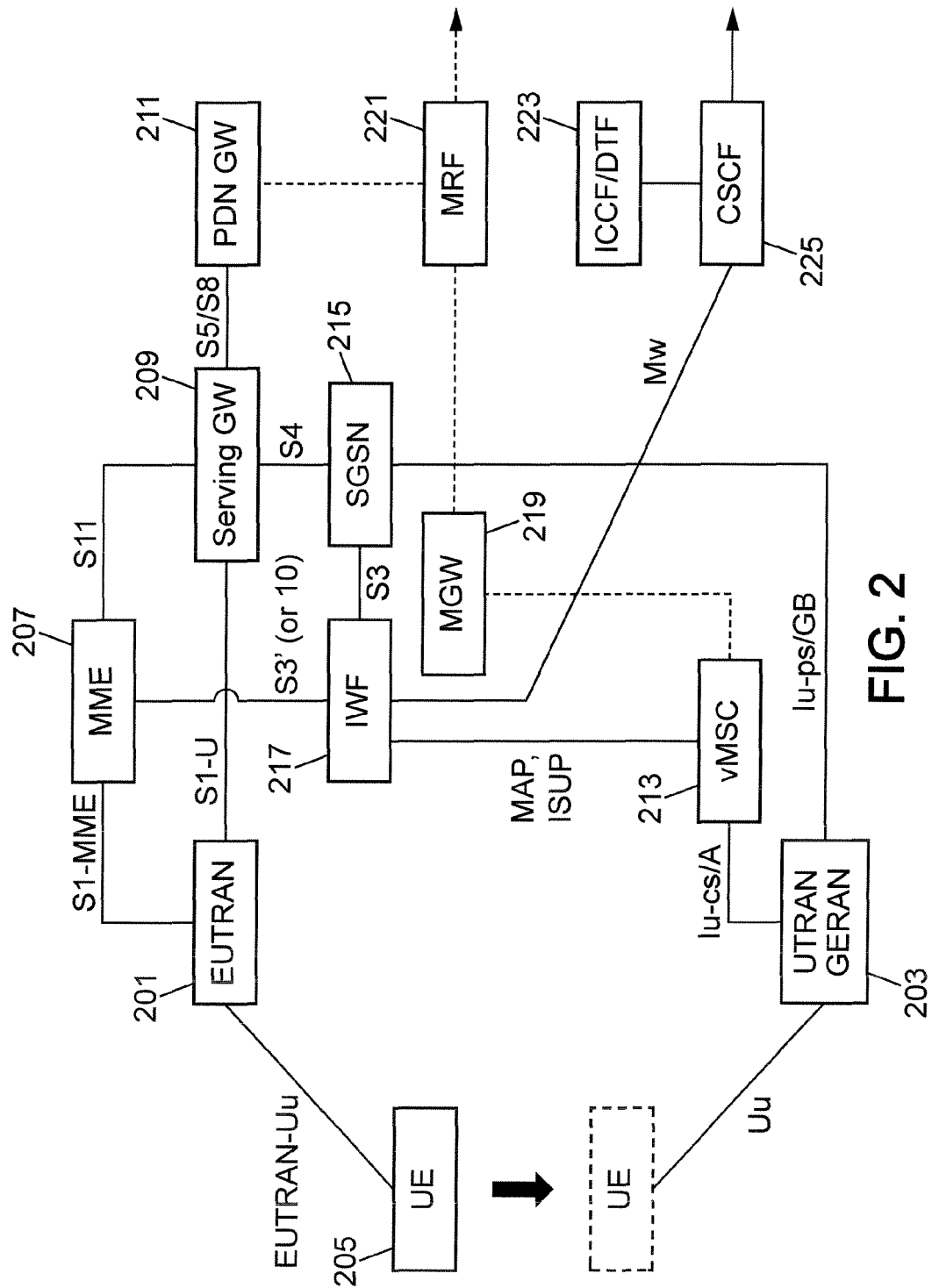
FIG. 2 is a block diagram illustrating a network architecture of a system capable of implementing the inter-MSC HO.

FIG. 2 shows a simplified block diagram of a network architecture of a radio communication system where the teachings of the present invention can be applied. This architecture is suitable for implementing the inter-MSC HO. EUTRAN 201 is the radio network access part of a 4G system, whereas UTRAN 203 is the radio network access part of a 3G system such as a universal mobile telecommunications system (UMTS). In the example shown, the UTRAN could be replaced with a GERAN which is the radio access network part for a 2G system, such as global system for mobile communications (GSM). In this figure, user equipment 205 is moving so that it is about to leave the coverage area of the 4G system so that a handover has to be performed to the UTRAN or GERAN. The 4G system also has a mobility management entity (MME) 207 for taking care of mobility management in the system. The serving gateway (GW) 209 is connected to the packet data network (PDN) GW 211.

On the 3G (or 2G) system side there are shown a visited mobile switching centre (vMSC) 213 and a support general packet radio system (GPRS) service node (SGSN) 215. The 4G and 3G (or 2G) systems are connected to each other through an interworking function (IWF) node 217. In the figure there are further shown a media gateway 219, a media resource function (MRF) node 221, an IMS CS control function (ICCF)/domain transfer function (DTF) node 223 and a call session control function (CSCF) 225.

In one embodiment, when performing the inter-MSC HO the interworking function (IWF) is arranged to separate voice from non-voice sessions during EUTRAN to CS handover.

For voice sessions the IWF:
emulates PS HO and CS HO towards EUTRAN access (via MME) and towards legacy CS access (via vMSC), respectively;
emulates anchor MSC towards the vMSC;
presents an Mw-like interface to the home IMS in a manner similar to the I6 reference point between the IMS centralised service capable MSC (IMSC) and the call session control function (CSCF) as defined in TR 23.892 IMSC approach for non IMS centralised service (ICS) UE.

For non-voice sessions the IWF:
proxies PS handover/relocation messages between MME and SGSN or suspends them.

Thus, it can be realised that the solutions in this inter-MSC HO category do not require major changes to the deployed GERAN PS access network, e.g. no DTM, no VoIP related optimisations and no PS HO (contrary to the C-VCC approach). In other words the inter-MSC HO solution does not require any enhancements to existing GERAN access networks, nor deployment of UTRAN access network.

When the target access is UTRAN, either C-VCC or inter-MSC HO can be used and it is a matter of operator's preferences whether to use one or the other. If the UTRAN access supports VoIP efficiently e.g. via high speed packet access (HSPA), the operator may also prefer to keep the voice calls in the PS domain. In this case the voice continuity between E-UTRAN and UTRAN access is ensured via ordinary PS domain handover (i.e. the first step of C-VCC).

In case an operator has UTRAN or has started partial deployment of enhanced GERAN access that can support C-VCC (I.e. PS HO, DTM and VoIP-related optimisations), there is a need to interwork the two solutions by allowing using one or the other on per-call basis.

In the present embodiment the HO signaling from the MME 207 is initiated always towards the IWF node 217. On per-call basis and based on information about C-VCC support in the target cell the IWF 217 decides whether to split the voice bearers from non-voice bearers or not. If the target GERAN cell does not support C-VCC, the IWF 217 transforms PS HO into CS HO for voice bearers and proxies HO signaling between MME 207 and SGSN 215 for non-voice bearers or suspends the non-voice bearers. If on the other hand the target GERAN cell supports C-VCC, the IWF 217 proxies HO signaling between the MME 207 and the SGSN 215 for all bearers (i.e. voice and non-voice). The information related to C-VCC support in the target cell can be statically configured in the IWF 217 or dynamically obtained from the MME 207 during the HO signaling.

Figure 3:
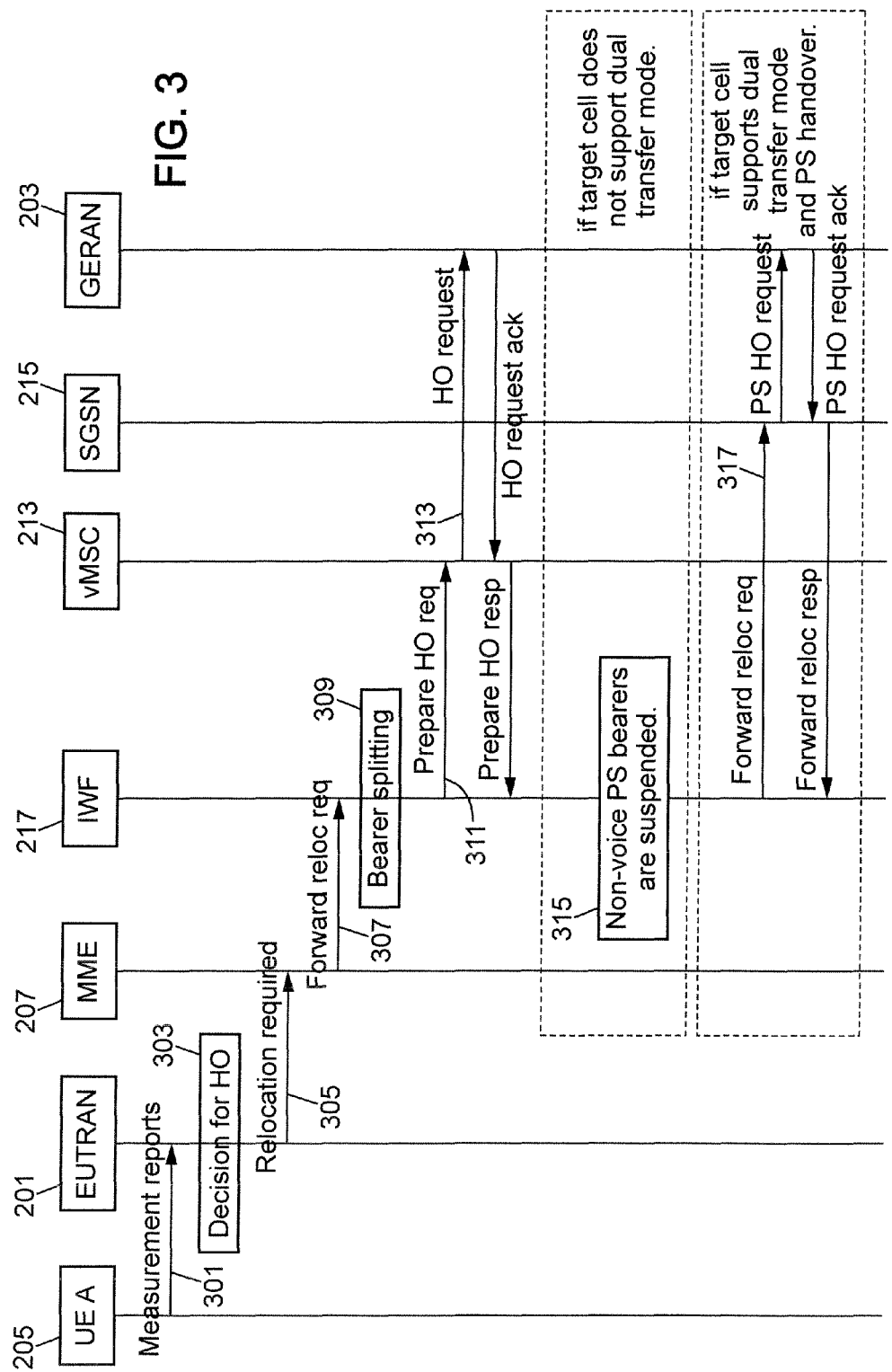
FIG. 3 is a flow chart illustrating the HO method, where bearer splitting is performed in accordance with an embodiment of the present invention.

FIG. 3 shows a flow chart describing the DT from IMS/EUTRAN to GERAN CS. In step 301 the UE 205 sends measurement reports to the source EUTRAN 201. In step 303 the source EUTRAN 201 based on these measurements then decides to trigger a handover. In step 305 the EUTRAN 201 sends a "relocation required" (also known as "handover required") message to the MME 207 which in step 307 forwards the "relocation required" message to the IWF node 217.

The IWF node 217 performs bearer splitting in step 309. In other words the IWF node 217 separates the VoIP bearer from all other PS bearers and forwards it to vMSC in step 311. Once the vMSC 213 receives the "prepare HO request" sent in step 311, it sends in step 313 a "handover request" to the GERAN 203. This handover request is then acknowledged by the GERAN 203. In step 315 the remaining non-voice PS bearers are suspended if the target cell does not support dual transfer mode or relocated in step 317 towards the SGSN if the target cell supports dual transfer mode and PS handover. The rest of the signaling is not described in this context, but the signaling follows the standard procedure for performing a HO.

Figure 4:
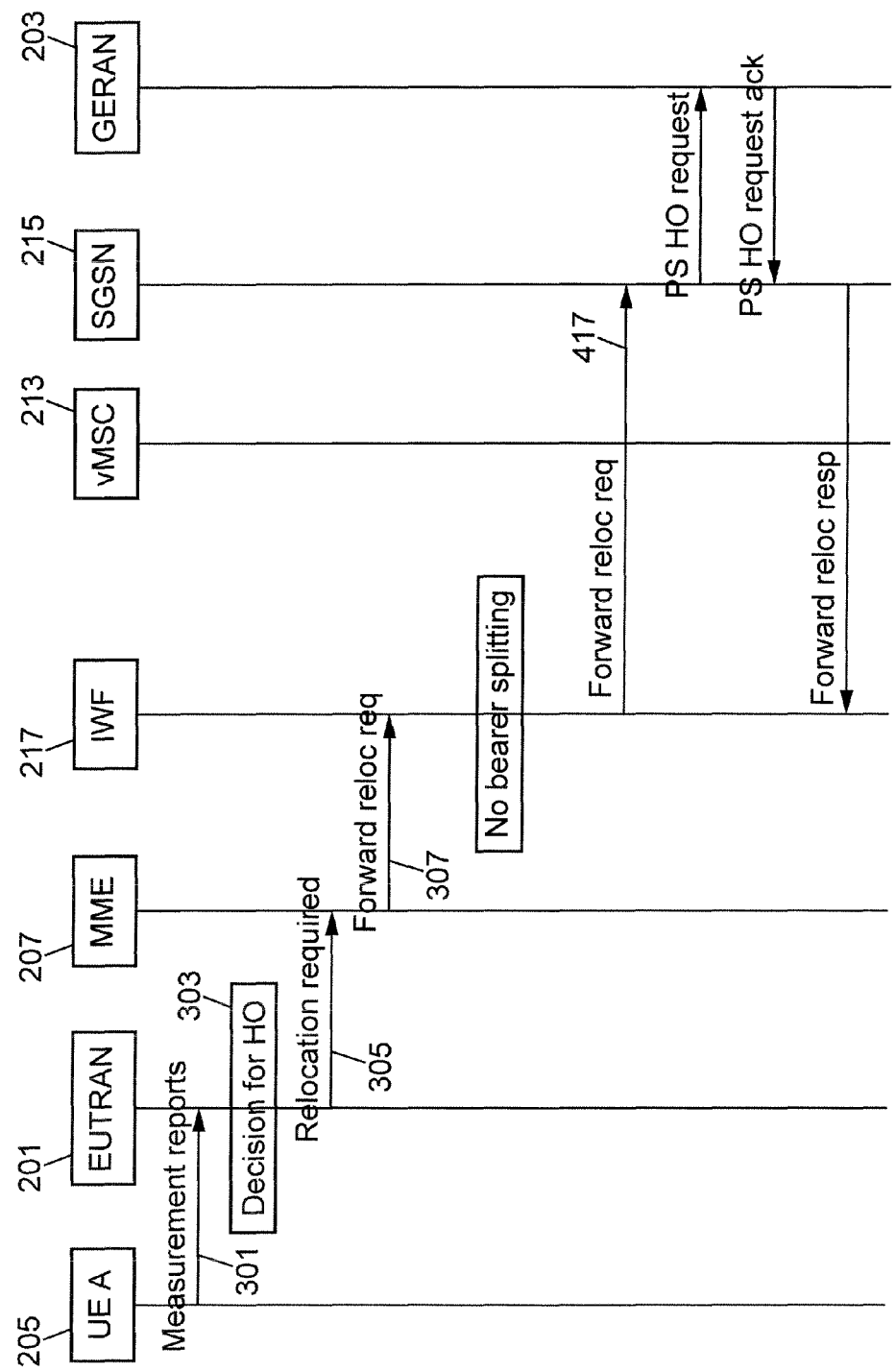
FIG. 4 is a flow chart illustrating the HO method where no bearer splitting is performed in accordance with an embodiment of the present invention.

In case a voice continuity is done from IMS/EUTRAN to GERAN CS and the GERAN supports PS HO, DTM operation and VoIP related enhancements, the flow chart is slightly different and is shown in FIG. 4. The IWF 217 decides not to perform bearer splitting and initiates the PS HO procedure for all bearers by sending in step 417 a "forward relocation request" to the SGSN 215.

When the target access is UTRAN it is a matter of operator's preferences whether to perform bearer splitting or not.

Above one embodiment of the invention was described where the bearer splitting was done by the IWF node 217 associated with the inter-MSC HO solution. However, such description is to be considered illustrative or exemplary and not restrictive, the invention being not restricted to the disclosed embodiment. For instance, the bearer splitting can be done by other nodes, such as the MME 207. Also instead of determining whether the target cell supports C-VCC, it can be determined whether the target cell supports PS HOs, DTM and VoIP enhancements. Other variations to the disclosed embodiment can be understood and effected by those skilled in the art in practicing the claimed invention, from a study of the drawings, the disclosure and the appended claims.

In the claims, the word "comprising" does not exclude other elements or steps, and the indefinite article "a" or "an" does not exclude a plurality. A single processor or other unit may fulfill the functions of several items recited in the claims. The mere fact that different features are recited in mutually different dependent claims does not indicate that a combination of these features cannot be advantageously used. Any reference signs in the claims should not be construed as limiting the scope of the invention.

The invention claimed is:

1. A node comprising:
communication circuitry and processing circuitry configured to achieve co-existence of single radio voice call continuity solutions in a communication system between:
   a source cell of a first radio access network that supports packet switched voice; and
   a target cell of a second radio access network that supports at least circuit switched voice;
wherein the processing circuitry is configured to perform bearer splitting by separating voice bearers from non-voice bearers based on information about support for dual transfer mode, packet switched handovers and voice over internet protocol related enhancements in the target cell;
wherein if the second radio access network does not support dual transfer mode, packet switched handovers, and voice over internet protocol related enhancements, the processing circuitry is further configured to:
   transform packet switched handovers to circuit switched handovers, towards circuit switched domain core network of the second radio access network for voice bearers; and perform one of:
      transfer handover signaling between the node and a packet switched domain core network of the second radio access network for non-voice bearers; or
      suspend the non-voice bearers; and
wherein if the second radio access network supports dual transfer mode, packet switched handovers and voice over internet protocol related enhancements, the processing circuitry is further configured to transfer handover signaling between the node and the packet switched domain core network of the second radio access network for voice bearers and non-voice bearers.

2. The node according to claim 1, wherein the processing circuitry is further configured to treat voice bearers and non-voice bearers in different manners when performing a handover from the first radio access network to the second radio access network based on information about support for dual transfer mode, packet switched handovers and voice over internet protocol related enhancements in the target cell.

3. The node according to claim 1, wherein the circuit switched domain core network of the second radio access is a mobile switching centre, and the packet switched domain core network of the second radio access is a support general packet radio system service node.

4. The node according to claim 1, wherein the first radio access network is evolved universal terrestrial radio access network and the second radio access network is one of the following: universal terrestrial radio access network, and general packet radio system with enhanced data rates for global mobile communications system radio access network.

5. The node according to claim 1, wherein the processing circuitry is further configured to dynamically obtain, through the communication circuitry from the first radio access network, information indicative of whether the second radio access network supports dual transfer mode, packet switched handovers, and voice over internet protocol related enhancements.

6. The node according to claim 1, wherein the processing circuitry is further configured to perform bearer splitting on a per-call basis.

7. The node according to claim 1, wherein the processing circuitry is further configured to store statically configured information indicative of whether the second radio access network supports dual transfer mode, packet switched handovers, and voice over internet protocol related enhancements.

8. A method for achieving co-existence of single radio voice call continuity solutions in a communication system between a source cell of a first radio access network that supports packet switched voice and a target cell of a second radio access network that supports at least circuit switched voice, the method comprising:
performing bearer splitting by separating voice bearers from non-voice bearers based on information about support for dual transfer mode, packet switched handovers, and voice over internet protocol related enhancements in the target cell, wherein the bearer splitting comprises:
   if the second radio access network does not support dual transfer mode, packet switched handovers and voice over internet protocol related enhancements:
      transforming packet switched handover to circuit switched handover, towards circuit switched domain core network of the second radio access network for voice bearers; and performing one of:
         transferring handover signaling between a node of the first radio access network and a packet switched domain core network of the second radio access network for non-voice bearers; or
         suspending the non-voice bearers; and
   if the second radio access network supports dual transfer mode, packet switched handovers, and voice over internet protocol related enhancements:
      transferring handover signaling between the node and the packet switched domain core network of the second radio access network for voice bearers and non-voice bearers.

9. The method according to claim 8, further comprising:
treating the voice bearers and non-voice bearers in different manners when performing a handover from the first radio access network to the second radio access network based on information about support for dual transfer mode, packet switched handovers, and voice over internet protocol related enhancements in the target cell.

10. The method according to claim 8, wherein the circuit switched domain core network of the second radio access is a mobile switching centre, and the packet switched domain core network of the second radio access is a support general packet radio system service node.

11. The method according to claim 8, wherein the first radio access network is evolved universal terrestrial radio access network, and the second radio access network is one of the following: universal terrestrial radio access network, and general packet radio system with enhanced data rates for global mobile communications system radio access network.

12. The method according to claim 8, further comprising performing one or more of:
obtaining dynamically, from the first radio access network, information indicative of whether the second radio access network supports dual transfer mode, packet switched handovers and voice over internet protocol related enhancements; or storing the information statically in a node configured to perform the bearer splitting.

13. The method according to claim 8, further comprising performing the bearer splitting is on a per-call basis.

14. A radio communication system comprising:
a node configured to facilitate handover of a single radio voice call from a first radio access network to a second radio access network without call interruption, wherein the first radio access network supports packet switched voice, and the second radio access network supports at least circuit switched voice;
wherein in facilitating the handover, the node is configured to perform bearer splitting by separating voice bearers from non-voice bearers based on information about support for dual transfer mode, packet switched handovers and voice over internet protocol related enhancements over the second radio access network;
wherein if the second radio access network does not support dual transfer mode, packet switched handovers, and voice over internet protocol related enhancements, the node is further configured to:
transform packet switched handovers to circuit switched handovers, towards circuit switched domain core network of the second radio access network for voice bearers; and perform one of:
transfer handover signaling between the node and a packet switched domain core network of the second radio access network for non-voice bearers; or
suspend the non-voice bearers; and
wherein if the second radio access network supports dual transfer mode, packet switched handovers and voice over internet protocol related enhancements, the node is further configured to transfer handover signaling between the node and the packet switched domain core network of the second radio access network for voice bearers and non-voice bearers.

15. The radio communication system according to claim 14, wherein the node is further configured to treat voice bearers and non-voice bearers in different manners when performing a handover from the first radio access network to the second radio access network based on information about support for dual transfer mode, packet switched handovers and voice over internet protocol related enhancements in the target cell.

16. The radio communication system according to claim 15, wherein the circuit switched domain core network of the second radio access is a mobile switching centre, and the packet switched domain core network of the second radio access is a support general packet radio system service node.

17. The radio communication system according to claim 14, wherein the first radio access network is evolved universal terrestrial radio access network and the second radio access network is one of the following: universal terrestrial radio access network, and general packet radio system with enhanced data rates for global mobile communications system radio access network.

18. The radio communication system according to claim 14, wherein the node is further configured to dynamically obtain, through the communication circuitry from the first radio access network, information indicative of whether the second radio access network supports dual transfer mode, packet switched handovers, and voice over internet protocol related enhancements.

* * * * *